US006054224A

United States Patent [19]

Nagai et al.

[11] Patent Number: 6,054,224

[45] Date of Patent: Apr. 25, 2000

[54] POLYESTER FILM FOR ELECTRICAL INSULATION

[75] Inventors: Itsuo Nagai; Seizo Aoki; Yukichi Deguchi, all of Shiga, Japan

[73] Assignee: Toray Industries, Inc., Japan

[21] Appl. No.: 09/297,116

[22] PCT Filed: Aug. 25, 1997

[86] PCT No.: PCT/JP97/02947

§ 371 Date: May 6, 1999

§ 102(e) Date: May 6, 1999

[87] PCT Pub. No.: WO99/10417

PCT Pub. Date: Mar. 4, 1999

[51] Int. Cl.[7] ............................ B32B 27/06; H01B 17/00

[52] U.S. Cl. ........................ 428/480; 428/458; 428/473.5; 428/480; 428/626; 417/410.1; 181/403; 156/51; 156/56; 174/107; 174/110 R; 174/119 R; 174/120 R; 174/110 SR; 174/137 R

[58] Field of Search ................................ 428/458, 473.5, 428/480, 626; 417/410.1; 181/403; 156/51, 56; 174/107, 110 R, 119 R, 120 R, 110 SR, 137 R

[56] References Cited

U.S. PATENT DOCUMENTS

| | | | |
|---|---|---|---|
| 4,482,546 | 11/1984 | Takahashi et al. | 424/211 |
| 4,859,229 | 8/1989 | Wenger et al. | 71/92 |
| 4,941,909 | 7/1990 | Wenger et al. | 71/92 |
| 5,017,211 | 5/1991 | Wenger et al. | 71/92 |
| 5,041,156 | 8/1991 | Suchy et al. | 71/92 |
| 5,066,657 | 11/1991 | Hayashi et al. | 514/269 |
| 5,084,084 | 1/1992 | Satow et al. | 71/92 |
| 5,116,404 | 5/1992 | Ishii et al. | 71/92 |
| 5,127,935 | 7/1992 | Satow et al. | 71/92 |
| 5,154,755 | 10/1992 | Satow et al. | 71/92 |
| 5,183,492 | 2/1993 | Suchy et al. | 504/243 |
| 5,276,038 | 1/1994 | Takasugi et al. | 514/259 |
| 5,336,663 | 8/1994 | Wenger et al. | 504/243 |

FOREIGN PATENT DOCUMENTS

| | | |
|---|---|---|
| 1248536 | 1/1989 | Canada . |
| 2119036 | 4/1993 | Canada . |
| 0 093 610 | 11/1983 | European Pat. Off. . |
| 1-229040 | 9/1989 | Japan . |
| 2-272713 | 11/1990 | Japan . |
| 9-100363 | 4/1997 | Japan . |
| 9-194603 | 7/1997 | Japan . |

OTHER PUBLICATIONS

J. Heterocycl. Chem. 4, Sep. 1967, pp. 413–414.
Chem. Abstract 119:117269 and JP 05,025142.
J. Heterocycl. Chem. 9, Jun. 1972, pp. 513–522.
Tetrahedron Lett., (month unavailable) 1967, pp. 961–62.

*Primary Examiner*—Samuel A. Acquah
*Attorney, Agent, or Firm*—Austin R. Miller

[57] ABSTRACT

An electrical insulating polyester film has an apparent density of 1.37 to 0.85 g/cm$^3$ and a tensile modulus of 2.0 to 4.5 GPa.

A film having low oligomer content, low cost, high heat resistance, high impact resistance, superior machinability and processability, assembling stability, and superior visibility is obtained. Furthermore, leakage of current is reduced when it is used for motor insulation.

32 Claims, No Drawings

POLYESTER FILM FOR ELECTRICAL INSULATION

TECHNICAL FIELD

The present invention relates to polyester films and to composite films for electrical insulation. More particularly, the present invention relates to a polyester film and to a composite film which are used for insulation of compressor motors in cooling systems such as refrigerators and air conditioners, are used for a variety of electrical insulation, contains reduced amounts of oligomers, improves set stability after assembly, facilitates confirmation of set assembly by being colored, and improves machinability and processability, and can reduce leakage of current.

BACKGROUND ART

Polyester films having high intrinsic viscosity have been conventionally used to reduce oligomers, and terminal blocking agents have been used to improve hydrolysis resistance of the polyester films.

Although various heat-resistant films have been used to simultaneously satisfy the above properties, the films still have some problems, such as increased cost, difficult set assembly, unsatisfactory stability after set, and insufficient machinability and processability.

Japanese Patent Application Laid-Open No. 9-100363 discloses a heat-resistant, low-dielectric plastic insulating film having voids and a dielectric constant lower than a particular value. The film has a low dielectric constant to reduce leakage power dissipation in an insulating section caused by high-frequency trends of instruments. Low oligomer contents and ready set assembly when the film is used in electrical insulation, however, are not taken into consideration, and thus the film is not durable in practice. Japanese Patent Application Laid-Open No. 5-194773 discloses a polyester film having a specified apparent density and a tensile modulus, but use of the film in electrical insulation has not been suggested.

These electrical insulating films have the following problems.

(1) In view of global environmental protection, refrigeration media and oils causing lower levels of environmental pollution are being used. Further reduction in oligomers have been awaited in order to achieve this.

(2) Use of only heat-resistant films in refrigeration medium systems results in increased costs.

(3) When films are used in insulation of motors, they have insufficient machinability and processability (in thermoforming and slit bending processing), insufficient stability after set assembly (such as displacement and being loose), and insufficient visibility.

(4) Changes in refrigeration media and oils causes increased leakage of current.

It is an object of the present invention to solve these problems.

DISCLOSURE OF INVENTION

The present invention provides an electrical insulating polyester film having an apparent density of 1.37 to 0.85 g/cm$^3$ and a tensile modulus of 2.0 to 4.5 GPa. The present invention also provides an electrical insulating polyester film having the above characteristics and a dielectric constant of 2.2 to 3.0.

The present invention further provides an electrical insulating composite film comprising a heat-resistant film laminated on at least one face of the polyester film, the heat-resistant film having heat resistance higher than that of the polyester film.

The present invention further provides an insulating system in which the electrical insulating polyester film or the electrical insulating composite film is used for electrical insulation in an environment comprising a refrigerating medium of partially-hydrogenated halogenated hydrocarbon as a primary component and a polar oil, and an hermetic-type compressor comprising a motor in which the insulating system is used for insulating an exciting coil.

BEST MODE FOR CARRYING OUT THE INVENTION

Polyester used in a polyester film of the present invention is a crystalline thermoplastic resin composition which is polymerized by esterification, and such polyester is obtained by polycondensation of a dicarboxylic acid component and a glycol component.

Examples of dicarboxylic acid components used include terephthalic acid, isophthalic acid, naphthalene dicarboxylic acid, cyclohexane dicarboxylic acid, and diphenylethane dicarboxylic acid. Examples of glycol components used include ethylene glycol, propylene glycol, tetramethylene glycol, and cyclohexane dimethanol. Among these, preferable acid components are terephthalic acid and naphthalene-2,6-dicarboxylic acid, and preferably glycol components are ethylene glycol and propylene glycol.

The melting point of the polyester is preferably 250° C. or more in view of heat resistance, and 300° C. or less in view of productivity. Examples of preferable polyesters include polyethylene terephthalate, polyethylene 2,6-naphthalate, poly-1,4-cyclohexylenedimethylene terephthalate, and polypropylene terephthalate. Among these, polyethylene terephthalate and polyethylene 2,6-naphthalate are preferable in view of balance between properties and cost. These polymers may contain other components as comonomers or blends.

The polyester constituting the polyester film of the present invention has an intrinsic viscosity [η] of preferably 0.6 to 1.5 dl/g, more preferably 0.7 to 1.4 dl/g, and most preferably 0.8 to 1.3 dl/g. Since the oligomer content is undesirably high when the intrinsic viscosity [η] is less than 0.6 dl/g, it may unsuitable for electrical insulation or may have insufficient long-term heat resistance. When the intrinsic viscosity [η] is greater than 1.5 dl/g, the undesirably high viscosity may cause unsatisfactory thermoformability.

The polyester has an M/P ratio of desirably 1.8 or less, preferably 1.4 or less, more preferably 1.2 or less, and more preferably 1 or less, since insulating resistance is improved at normal and high temperatures, wherein the M/P ratio represents the molar ratio of the total metallic elements (M) excluding polymerization catalysts to the phosphorus element (P).

The polyester film of the present invention is preferably a biaxially-oriented film in view of mechanical, thermal and electrical characteristics, machinability and processability, and apparent density.

The apparent density viscosity of the electrical insulating polyester film of the present invention is 1.37 to 0.85 g/cm$^3$, preferably 1.3 to 0.9 g/cm$^3$, and more preferably 1.2 to 0.9 g/cm$^3$. When it is greater than 1.37 g/cm$^3$, problems, such as an increased oligomer content, insufficient machinability and processability, and an increased leakage current, will occur. Although the reasons for the reduced oligomer content when the apparent density is decreased are not clear, it is probably due to concentration and segregation of the oligomers on the voids formed in the interior or on the inner wall. When the apparent density is decreased, the amount of the polyester used will be decreased in a film having a predetermined thickness and thus the absolute oligomer content will be decreased. Decreasing the apparent density, however, does not always decrease the oligomer content, the Y/D ratio described below is also an important factor. When the apparent density is less than 0.85 g/cm$^3$, mechanical strength and impact resistance are insufficient in practice. For example, when assembled near an exciting coil of a motor (in a wedge or a slot liner), it may be broken. The above-mentioned range of the apparent density is achieved by controlling the ratio of voids formed in the film.

The electrical insulating polyester film of the present invention has a tensile modulus in a range of 2.0 to 4.5 GPa, preferably 2.5 to 4.5 GPa, and more preferably 3.0 to 4.5 GPa. When the tensile modulus is less than 2.0 GPa, the film does not have sufficient stiffness. For example, when the film is assembled near an exciting coil of a motor, it will bend. When the tensile modulus is greater than 4.5 GPa, the film has excessive stiffness; hence, it cannot maintain the shape in assembly by bending or curving, resulting in poor workability. The tensile modulus within the above-mentioned range can be achieved by the ratio of voids in the film and the drawing condition.

The ratio Y/D of the tensile modulus Y (GPa) to the apparent density D (g/cm$^3$) of the electrical insulating polyester film of the present invention satisfies the relationship $2.5<Y/D<4$. A high Y/D ratio means sufficient orientation, and orientation crystallization will result in a reduced oligomer content and improved heat resistance. When the Y/D ratio is 2.5 or less, problems due to the oligomer content and the heat resistance will occur. When the Y/D ratio is 4 or more, the film will be readily broken during drawing of the film, resulting in inferior film formability.

An example of a method in accordance with the present invention will now be described.

A polymer or fine particle which is not compatible with a polyester is added to the polyester, supplied to an extruder, and extruded from a T die to form a sheet. The sheet is heated to a temperature which is higher than the glass transition temperature of the polyester, and then drawn in the longitudinal direction. While the two ends of the film are fixed by clips, the film is introduced to a tenter so that the film is drawn in the lateral (width) direction perpendicular to the longitudinal direction while continuing heating to a temperature higher than the glass transition temperature. The film is then annealed to form a biaxially-oriented polyester film, in which relaxation in the width and longitudinal directions may be applied, if necessary.

The above incompatible polymer or fine particle may be that which can yield an apparent density required in the present invention. Example of the incompatible polymers include polyethylene, polypropylene, polybutene, and polymethylpenetene. These polymers are not always limited to homopolymers, and may be copolymers thereof. Among these, polyolefins having small critical surface tension and small dielectric constant are preferable. Polypropylene and polymethylpentene are preferable in view of decreased apparent density, heat resistance, and decreased leakage of current.

These incompatible polymers are present as particles in the polyester. A compatibilizer may be added to control the size of these particles. For example, polyalkylene glycols and copolymers thereof, such as polyethylene glycol and polypropylene glycol can be used. Although surfactants also can reduce the size of the particles, the content must be within a range not causing deterioration of electric characteristics.

Examples of fine particulate substances include organic particles and inorganic particles. Examples of organic particles used include silicon particles, polyimide particles, crosslinked styrene-divinylbenzene copolymer particles, crosslinked polyester particles, and Teflon (registered trade name) particles. Examples of inorganic particles include calcium carbonate, silicon dioxide, and barium sulfate. It is preferable that a surfactant not be used with the fine particles.

The method of addition to the polyester is not limited. When an incompatible polymer is used, a compound of the polymer with a polyester resin may be supplied to a film extruder, or a polyester resin and the polymer may be blended in a film extruder. A blending process is preferable in order to avoid decreased intrinsic viscosity [η], and a mechanical and forcible blending process just before supplying the blend to a film extruder is more preferable in view of angle of repose.

When a fine particle is used, it is preferably added in a polymerization process. More specifically, it is preferably added to ethylene glycol. When calcium carbonate particle is added, it is preferable that a phosphorus compound also be added in order to prevent yellowing and foaming.

Although the thickness of the polyester film of the present invention is not limited, it is in a range of preferably 25 to 350 μm and more preferably 50 to 250 ηm in view of insulating characteristics and workability when it is used for insulation of motors.

The polyester film of the present invention may not have a single-layered configuration, but preferably has a multilayered configuration including a base layer and a surface layer laminated on at least one surface. It is more preferable that surface layers be provided on the two surfaces of the film to reduce curling of the film. Furthermore, it is preferable that the surface layer have an apparent density which is greater than that of the base layer in view of mechanical strength, impact resistance, and prevention of bending during setting (into a wedge or slot liner). In a multilayered film, each of the polyester resins constituting the base layer and the surface layer has an intrinsic viscosity of 0.6 to 1.5 dl/g. It is preferable that these layers be primarily composed of polyethylene terephthalate or polyethylene 2,6-naphthalate. The Y/D ratio of the tensile modulus Y (GPa) to the apparent density D (g/cm$^3$) of the film preferably satisfies the relationship $2.5<Y/D<4$, as described above. In the multilayered film, the thickness of the surface layer preferably occupies 5 to 50% of the total thickness of the film in view of mechanical strength, impact resistance, and workability in assembly. It is preferable in order to prevent separation at the interface between the base layer and the surface layer that the multilayered film of the present invention be produced by melting polyester resins constituting a base layer and a surface layer, joining these layers, extruding them through a die, cooling them, and drawing the film in biaxial directions. The polyester resin for forming the base layer preferably contains a polymer or fine particle incompatible with the polyester resin, and more specifically a polyolefin, such as polypropylene or polymethylpentene.

The present invention also provides an electrical insulating composite film comprising the polyester film of the present invention and a heat-resistant film laminated thereon and having heat resistance higher than that of the polyester film, wherein polyester film has an apparent density of 1.37 to 0.85 g/cm$^3$ and a tensile modulus of 2.5 to 5.0 GPa. Lamination of the heat-resistant film facilitates use of the film in fields requiring high heat resistance. The heat-resistant film is preferably laminated on the two surfaces of the polyester film in view of heat resistance and mechanical characteristics.

In combinations of the polyester film with the heat-resistant film laminated on the polyester film, a heat-resistant film having higher intrinsic viscosity [72] is used when these films are composed of the same types of polyester films. Examples of preferable combinations of different types of polyester films include a polyethylene terephthalate type with a polyethylene naphthalate or polyphenylene sulfide type, and a polyethylene naphthalate type with a polyphenylene sulfide or aromatic polyimide type.

The polyester resin in the composite film preferably has an intrinsic viscosity [η] of 0.6 to 1.5 dl/g.

The Y/D ratio of the tensile modulus Y (GPa) to the apparent density D (g/cm$^3$) of the film preferably satisfies the relationship 3.0<Y/D <4.5, for the reasons described above.

The polyester film and the composite film of the present invention are preferably used in insulating systems for electrical insulation in mixed environments of a refrigeration medium composed of partly-hydrogenated halogenated carbon as a primary component and a polar oil. These films are more preferably used for insulating exciting coils of motors which are used in mixed environments of a refrigeration medium composed of partly-hydrogenated halogenated carbon as a primary component and a polar oil in hermetic-type compressors.

The electrical insulating polyester film of the present invention has a dielectric constant of preferably 2.2 to 3.0, more preferably 2.4 to 3.0, and most preferably 2.5 to 3.0, for the above purpose. The electrical insulating composite film of the present invention has a dielectric constant of preferably 2.4 to 3.0 and more preferably 2.6 to 3.0. When the dielectric constant is significantly large, a large leakage current is generated; hence, the instrument may not be safely used. When the dielectric constant is significantly small, impractical unbalance with mechanical characteristics may occur.

In order to solve problems of ozone layer destruction caused by Flon gas, Flon substitutes and refrigeration and air-conditioning systems using the Flon substitutes have been intensively developed, based on so-called "Montreal Protocol". In such cases, a refrigeration medium, so called a "Flon substitute" in which halogen is partly replaced with hydrogen, is used instead of conventional fully-halogenated carbon. The Flon substitute has bonds of hydrogen atoms instead of halogen atoms and has polarity; hence it is rarely used with conventional nonpolar oils and alkylbenzene-based oils because it is substantially insoluble with these oils. Thus, it is being used with polar oils, such as polyol esters, polyalkylene glycol, carbonate esters, ethers, and fluorine compounds. When a conventional polyester film is used in these mixed environments, it will generate undesirably large leakage currents caused by increased capacitance in an insulating system probably due to a high dielectric constant of a polar oil. When the polyester film or the composite film of the present invention is used in an insulating system, safety and reliability are improved due to decreased leakage of current. These advantages are noticeable when it is used for insulating of the exciting coil of a motor which is used in a hermetic-type compressor.

Methods for Evaluating Physical Properties and Advantages (1) Apparent Density

The apparent density was measured by an electromagnetic balance (SD-120L made by Kensei Kogyo Co., Ltd.).

(2) Intrinsic Viscosity [η]

A specimen was dried at 105° C. for 20 minutes, was weighed by 6.8±0.005 g, and was dissolved into o-chlorophenol while being stirred at 160° C. for 15 minutes. After cooling, the viscosity at 25° C. was measured by an automatic viscometer AVM-10S made by Yamato Lab-Tech Co., Ltd.

(3) Oligomer Content

Using R407C (AC9000, $CH_2F_2$:$CF_3CHF_2$:$CH_3CH_2F$= 23:25:52) as a refrigeration medium and a polyol ester oil (VG32) as an oil, a specimen was placed into an autoclave at 150° C. and 35 kg/cm$^2$ and was treated for 1,000 hours. The oligomer (cyclic trimer) content in the oil-refrigeration medium was determined by liquid chromatography and classified based on the following standards.

0.6 percent by weight or more: C 0.35 percent by weight or less: A an intermediate: B (4) Machinability A film with a thickness of 250 μm was cut into a 10-cm×20-cm sheet. The sheet was rolled up along the 20-cm dimension and the 10-cm side was fixed with an adhesive tape to form a cylindrical shape. The cylinder was placed on a flat plate, another flat plate was placed thereon, and then deformation when a 10-kg weight was placed thereon was measured based on the following standards.

A: The shape did not change.

B: The shape changed slightly, but was near that of the original.

C: The cylinder was completely deformed.

(5) Leakage Current

Film samples were assembled to a motor as a slot liner and a wedge and a leakage current was measured in a combination of a refrigeration medium AC9000 and an oil VG32 based on the following standards.

A: Leakage current of 0.8 mA or less

B: Leakage current of 0.8 to 1 mA

C: Leakage current of 1 mA or more (6) Heat Resistance

Specimens were exposed at 180° C. in an oven, and one was removed every 24 hours to measure tensile elongation. The heat resistance was represented by the time when the tensile elongation was one-half the initial value. The tensile elongation was measured by ASTM-D882-61T.

(7) Tensile Modulus

The tensile modulus was measured at 25° C. and 65% RH using an Instron-type tensile testing machine according to Japanese Industrial Standard (JIS) Z1702.

EXAMPLES AND COMPARATIVE EXAMPLES

The present invention will now be described in more detail with reference to the following EXAMPLES AND COMPARATIVE EXAMPLES.

EXAMPLES 1 to 8 and COMPARATIVE EXAMPLES 2 to 4

In the presence of 0.09 parts by weight of calcium acetate as a catalyst, 85 parts by weight of dimethylene terephthalate and 60 parts by weight of diethylene glycol were subjected to ester exchange reaction. An ethylene glycol solution containing 0.20 percent by weight of trimethyl phosphate was added, and an ethylene glycol slurry of calcium carbonate of an average particle size of 1.1 μm was added so that polyethylene terephthalate had a calcium carbonate content shown in Table 1. Next, polycondensation was performed using 0.03 parts by weight of antimony trioxide as a catalyst to prepare polyethylene terephthalate having an intrinsic viscosity of 0.68 dl/g.

The polyethylene terephthalate was dried at 170° C. in vacuo, supplied to an extruder heated to 280° C., extruded through a T die, and then cooled on a cooling drum at 30° C. to form a cast film. The film was heated to 85 to 95° C., drawn by 3.3 to 4.1 times in the longitudinal direction, annealed at 220° C., uniformly cooled to room temperature, and wound to form a film of 250 μm.

COMPARATIVE EXAMPLE 1

Polymerization was performed as in EXAMPLE 1, except that calcium carbonate and trimethyl phosphonate were not used to prepare polyethylene terephthalate having an intrinsic viscosity of 0.68 dl/g.

Film forming conditions were completely the same as in EXAMPLE 1.

EXAMPLE 9

A sample was prepared as in EXAMPLE 1, in which polyethylene terephthalate had an intrinsic viscosity of 0.51 dl/g, and the calcium carbonate content and the film forming conditions were the same as those in EXAMPLE 1. When polyethylene terephthalate having an intrinsic viscosity of 1.6 dl/g was used, elongation was not achieved due to an extraordinarily high tensile stress.

EXAMPLES 10 AND 11

Films were formed under the conditions as in EXAMPLE 1, in which 5 and 10 percent by weight of polymethylpentene and 0.5 percent by weight of polyethylene glycol as a compatibilizer were added to polyethylene terephthalate having an intrinsic viscosity of 0.68.

EXAMPLE 12

A film was prepared as in EXAMPLE 10, in which 5 percent by weight of polypropylene homopolymer was used in place of polymethylpentene.

EXAMPLE 13

A sample was prepared as in EXAMPLE 1, in which 10 percent by weight of calcium carbonate was added to polyethylene naphthalate having an intrinsic viscosity of 0.75 and the longitudinal stretching temperature was 100° C.

EXAMPLE 14

A film was formed as in EXAMPLE 1, in which the same base layer resin as in EXAMPLE 1 was used and a surface layer resin not containing calcium carbonate was used. These were extruded through T dies of different extruders as a three-layered composite sheet. The total thickness was 250 μm, and the thickness of each of the two surface layers was 25 ηm.

EXAMPLE 15

A film was formed as in EXAMPLE 14, in which polyethylene terephthalate having an intrinsic viscosity of 0.75 was used as a polyester resin, and 10 percent by weight of calcium carbonate was added to only the base layer resin.

EXAMPLE 16

A film was formed as in EXAMPLE 14, in which 3 percent by weight of calcium carbonate was added to the base layer resin.

EXAMPLE 17

A film was formed as in EXAMPLE 14, in which polyethylene terephthalate having an intrinsic viscosity of 0.85 was used as a surface layer resin, and polyethylene terephthalate having an intrinsic viscosity of 0.68 and containing 10 percent by weight of calcium carbonate was used as a base layer resin.

Film configurations and test results of EXAMPLES 1 to 17 and COMPARATIVE EXAMPLES 1 to 4 are summarized in Tables 1 to 4. Since the polyester films of the present invention have low extracted oligomer contents, satisfactory machinability, and high heat resistance, these are preferably used for electrical insulation. Since most of them have low dielectric constants and small leakage of current, these can be safely used in new Flon systems. Although the film in EXAMPLE 4 does not have problems in performance, formation of the film was not stabilized due to a high Y/D ratio causing frequent breaks during elongation. In EXAMPLE 6, the tensile strength was just at the lower limit and thus had slightly unsatisfactory machinability. In EXAMPLE 9, since the intrinsic viscosity was 0.51, the extracted oligomer content was slightly high and thus heat resistance was slightly decreased. In COMPARATIVE EXAMPLE 1, the apparent density was high and the extracted oligomer content was high. In COMPARATIVE EXAMPLES 2 and 3, the apparent density was high and the tensile modulus was low due to insufficient elongation; hence the extracted oligomer content, machinability, and heat resistance were unsatisfactory. In COMPARATIVE EXAMPLE 4, the apparent density was excessively low and the tensile modulus was low; hence, machinability was unsatisfactory and the film could not be used for motor insulation.

TABLE 1

| | Film Configuration | Intrinsic Viscosity of Polyester (dl/g) |
|---|---|---|
| EXAMPLE 1 | PET + $CaCO_3$ (10%) | 0.68 |
| EXAMPLE 2 | PET + $CaCO_3$ (10%) | 0.68 |
| EXAMPLE 3 | PET + $CaCO_3$ (10%) | 0.68 |
| EXAMPLE 4 | PET + $CaCO_3$ (10%) | 0.68 |
| EXAMPLE 5 | PET + $CaCO_3$ (10%) | 0.68 |
| EXAMPLE 6 | PET + $CaCO_3$ (20%) | 0.68 |
| EXAMPLE 7 | PET + $CaCO_3$ (5%) | 0.68 |

TABLE 1-continued

| | Film Configuration | Intrinsic Viscosity of Polyester (dl/g) |
|---|---|---|
| EXAMPLE 8 | PET + $CaCO_3$ (1%) | 0.68 |
| EXAMPLE 9 | PET + $CaCO_3$ (10%) | 0.51 |
| EXAMPLE 10 | PET + PMP (5%) | 0.68 |
| EXAMPLE 11 | PET + PMP (10%) | 0.68 |
| EXAMPLE 12 | PET + PP (5%) | 0.68 |
| EXAMPLE 13 | PEN + $CaCO_3$ (10%) | 0.75 |
| EXAMPLE 14 | PET/PET + $CaCO_3$ (10%)/PET | 0.68 |
| EXAMPLE 15 | PEN/PEN + $CaCO_3$ (10%)/PEN | 0.75 |
| EXAMPLE 16 | PET + $CaCO_3$ (3%)/PET + $CaCO_3$ (10%)/PET + $CaCO_3$ (3%) | 0.68 |
| EXAMPLE 17 | PET1/PET2 + $CaCO_3$ (10%)/PET1 | PET1: 0.68, PET2: 0.85 |
| COMPARATIVE EXAMPLE 1 | PET | 0.68 |
| COMPARATIVE EXAMPLE 2 | PET + $CaCO_3$ (10%) | 0.68 |
| COMPARATIVE EXAMPLE 3 | PET + $CaCO_3$ (20%) | 0.68 |
| COMPARATIVE EXAMPLE 4 | PET + $CaCO_3$ (20%) | 0.68 |

TABLE 2

| | Longitudinal Elongation Temp. (° C.) | Elongation (Longitudinal × Lateral) | Apparent Density (g/cm$^3$) | Tensile Modulus (GPa) | Y/D ratio | Dielectric Constant |
|---|---|---|---|---|---|---|
| EXAMPLE 1 | 90 | 3.8 × 3.8 | 1.03 | 3.5 | 3.4 | 2.6 |
| EXAMPLE 2 | 90 | 3.3 × 3.2 | 1.3 | 2.7 | 2.1 | 3.1 |
| EXAMPLE 3 | 85 | 3.7 × 3.6 | 0.89 | 3.4 | 3.8 | 2.5 |
| EXAMPLE 4 | 85 | 4.1 × 4.2 | 0.88 | 3.9 | 4.4 | 2.3 |
| EXAMPLE 5 | 95 | 3.8 × 3.8 | 1.23 | 3.3 | 2.7 | 3 |
| EXAMPLE 6 | 90 | 3.8 × 3.8 | 0.86 | 2.6 | 2.9 | 2.3 |
| EXAMPLE 7 | 90 | 3.8 × 3.8 | 1.2 | 3.7 | 3.1 | 2.9 |
| EXAMPLE 8 | 90 | 3.8 × 3.8 | 1.36 | 4.4 | 3.2 | 3.2 |
| EXAMPLE 9 | 90 | 3.8 × 3.8 | 1.05 | 3.3 | 3.1 | 2.6 |
| EXAMPLE 10 | 90 | 3.8 × 3.8 | 1.15 | 3.4 | 3 | 2.8 |
| EXAMPLE 11 | 90 | 3.8 × 3.8 | 0.98 | 3.4 | 3.5 | 2.6 |
| EXAMPLE 12 | 90 | 3.8 × 3.8 | 1.1 | 3.3 | 3 | 2.7 |
| EXAMPLE 13 | 100 | 3.8 × 3.8 | 1.1 | 4.2 | 3.8 | 2.6 |
| EXAMPLE 14 | 90 | 3.8 × 3.8 | 1.18 | 3.8 | 3.2 | 2.9 |
| EXAMPLE 15 | 100 | 3.8 × 3.8 | 1.2 | 4.4 | 3.7 | 2.8 |
| EXAMPLE 16 | 90 | 3.8 × 3.8 | 1.15 | 3.7 | 3.2 | 2.8 |
| EXAMPLE 17 | 90 | 3.8 × 3.8 | 1.15 | 3.9 | 3.4 | 2.9 |
| COMPARATIVE EXAMPLE 1 | 90 | 3.8 × 3.8 | 1.39 | 4.5 | 3.2 | 3.3 |
| COMPARATIVE EXAMPLE 2 | 100 | 3.1 × 3.0 | 1.38 | 2.2 | 1.6 | 3.3 |
| COMPARATIVE EXAMPLE 3 | 100 | 3.1 × 3.1 | 1.32 | 1.8 | 1.4 | 3.1 |
| COMPARATIVE EXAMPLE 4 | 90 | 4.1 × 4.2 | 0.67 | 1.9 | 2.8 | 2.1 |

TABLE 3

| | Oligomer | Machinability | Heat Resistance | Leakage of Current |
|---|---|---|---|---|
| EXAMPLE 1 | A | A | A | A |
| EXAMPLE 2 | B | A | B | C |
| EXAMPLE 3 | A | A | A | A |
| EXAMPLE 4 | A | A | A | A |
| EXAMPLE 5 | A | A | A | A |
| EXAMPLE 6 | A | B | A | A |
| EXAMPLE 7 | A | A | A | A |
| EXAMPLE 8 | A | A | A | C |
| EXAMPLE 9 | B | A | B | A |
| EXAMPLE 10 | A | A | A | A |
| EXAMPLE 11 | A | A | A | A |
| EXAMPLE 12 | A | A | A | A |
| EXAMPLE 13 | A | A | A | A |
| EXAMPLE 14 | A | A | A | A |
| EXAMPLE 15 | A | A | A | A |
| EXAMPLE 16 | A | A | A | |

TABLE 3-continued

| | Oligomer | Machinability | Heat Resistance | Leakage of Current |
|---|---|---|---|---|
| EXAMPLE 17 | A | A | A | |
| COMPAPATIVE EXAMPLE 1 | C | A | A | C |
| COMPARATIVE EXAMPLE 2 | C | B | C | C |
| COMPARATIVE EXAMPLE 3 | C | C | C | C |
| COMPARATIVE EXAMPLE 4 | A | C | A | A |

EXAMPLES 18 AND 19

A polyester film with a thickness of 188 $\mu$m was prepared under the same conditions as in EXAMPLE 11. A solution was coated onto a 25$\mu$m polyethylene naphthalate film by a gravure coating process in which the solution was composed of 100 parts by weight of heat-resistant polyurethane adhesive "Adcoat" 76P1 made by Toyo-Morton, Ltd., 8 parts by weight of hardener and 32 parts by weight of ethyl acetate, and the thickness after curing was 6 μm. This film was bonded onto the two faces of the 188-ηm polyester film at a roll temperature of 80° C. and a line pressure of 3 kg/cm, in EXAMPLE 18. A polyphenylene sulfide film ("TORELINA" made by Toray Industries, Inc.) was used in place of the polyethylene naphthalate film, in EXAMPLE 19.

EXAMPLES 20 AND 21

Polyethylene naphthalate films with a thickness of 188 μm were prepared under the same conditions as those in EXAMPLE 13. In EXAMPLES 20 and 21, a 25-μm polyphenylene sulfide film and a 25-μm polyimide film ("KAPTON" made by DuPont-Toray Co., Ltd.), respectively, were bonded as in EXAMPLES 18 AND 19.

The film configurations and experimental results of EXAMPLES 18 to 21 are shown in Tables 4 and 5.

The composite films of the present invention have a satisfactory extracted oligomer content, satisfactory machinability, and high heat resistance. Since the dielectric constant is low, the leakage current is also low. Thus, these can be preferably used for electrical insulation.

TABLE 4

| | Film Configuration | Intrinsic Viscosity of Polyester (dl/g) |
|---|---|---|
| EXAMPLE 18 | PEN/PET + PMP (10%)/PEN | PET: 0.68, PEN: 0.85 |
| EXAMPLE 19 | PPS/PET + PMP (10%)/PPS | 0.68 |
| EXAMPLE 20 | PPS/PEN + $CaCO_3$ (10%)/PPS | 0.75 |
| EXAMPLE 21 | PI/PEN + $CaCO_3$ (10%)/PI | 0.68 |

(GPa) to the apparent density D (g/cm$^3$) of the film satisfies the relationship 2.5<Y/D<4.

4. An electrical insulating polyester film according to claim 1, wherein the polyester film has a multilayered configuration comprising a base layer and a surface layer provided on at least one surface thereof.

5. An electrical insulating polyester film according to claim 4, wherein the intrinsic viscosity of a polyester resin constituting the polyester film is 0.6 to 1.5 dl/g.

6. An electrical insulating polyester film according to claim 4, wherein the Y/D ratio of the tensile modulus Y (GPa) to the apparent density D (g/cm$^3$) of the film satisfies the relationship 2.5<Y/D<4.

7. An electrical insulating polyester film according to claim 4, wherein the apparent density of the surface layer is greater than the apparent density of the base layer.

8. An electrical insulating polyester film according to claim 4, wherein the thickness of the surface layer occupies 5 to 50% of the total thickness of the film.

9. An electrical insulating polyester film according to claim 4, wherein the film is produced by melting polyester resins constituting a base layer and a surface layer, conjugating these layers, extruding them through a die, cooling them, and stretching the film in biaxial directions.

10. An electrical insulating polyester film according to claim 4, wherein polyester resins for forming the base layer and the surface layer comprise polyethylene terephthalate.

11. An electrical insulating polyester film according to claim 4, wherein polyester resins for forming the base layer and the surface layer comprise polyethylene 2,6-naphthalate.

12. An electrical insulating polyester film according to claim 4, wherein a polyester resin for forming the base layer contains a polymer or fine particle incompatible with the polyester resin.

13. An electrical insulating polyester film according to claim 12, wherein the incompatible polymer is polyolefin.

TABLE 5

| | Apparent Density (g/cm$^3$) | Tensile Modulus (GPa) | Y/D Ratio | Dielectric Constant | Oligomer | Machinability | Heat Resistance | Leakage of Current |
|---|---|---|---|---|---|---|---|---|
| EXAMPLE 18 | 1.08 | 3.7 | 3.4 | 2.8 | A | A | A | A |
| EXAMPLE 19 | 1.06 | 3.6 | 3.4 | 2.7 | A | A | A | A |
| EXAMPLE 20 | 1.15 | 4.3 | 3.7 | 2.8 | A | A | A | A |
| EXAMPLE 21 | 1.17 | 3.8 | 3.2 | 2.9 | A | A | A | A |

Industrial Applicability

By using a polyester film having a particular apparent density range and a particular tensile modulus or a composite film provided with a heat-resistant film as an electrical insulating material, the film contains a low oligomer content, has low cost, high heat resistance, high impact resistance, superior machinability and processability, and assembling stability, and has superior visibility.

The apparent dielectric constant can be decreased, and thus leakage of current when a high-dielectric refrigeration medium is used can be reduced.

What is claimed is:

1. An electrical insulating polyester film having an apparent density of 1.37 to 0.85 g/cm$^3$ and a tensile modulus of 2.0 to 4.5 GPa.

2. An electrical insulating polyester film according to claim 1, wherein a polyester resin constituting the polyester film has an intrinsic viscosity of 0.6 to 1.5 dl/g.

3. An electrical insulating polyester film according to claim 1, wherein the ratio Y/D of the tensile modulus Y 14. An electrical insulating polyester film according to claim 13, wherein the polyolefin is polypropylene or polymethylpentene.

15. An electrical insulating polyester film according to claim 1, wherein the film has a dielectric constant of 2.2 to 3.0.

16. An electrical insulating composite film comprising a heat-resistant film laminated on at least one face of a polyester film according to claim 1, the heat-resistant film having heat resistance higher than that of the polyester film.

17. An electrical insulating composite film according to claim 16, wherein the heat-resistant film having heat resistance higher than that of the polyester film is laminated on the two faces of the polyester film.

18. An electrical insulating composite film according to claim 16, wherein the polyester film comprises polyethylene terephthalate, and the heat-resistant film comprises polyphenylene sulfide or polyethylene naphthalate.

19. An electrical insulating composite film according to claim 17, wherein the polyester film comprises polyethylene terephthalate, and the heat-resistant film comprises polyphenylene sulfide or aromatic polyimide.

20. An electrical insulating composite film according to claim 16, wherein the composite film has an apparent density of 1.37 to 0.85 g/$cm^3$ and a tensile modulus of 2.5 to 5.0 GPa.

21. An electrical insulating composite film according to claim 17, wherein the composite film has an apparent density of 1.37 to 0.85 g/$cm^3$ and a tensile modulus of 2.5 to 5.0 GPa.

22. An electrical insulating composite film according to claim 16, wherein a polyester resin constituting the polyester film has an intrinsic viscosity of 0.6 to 1.5 dl/g.

23. An electrical insulating composite film according to claim 16, wherein the Y/D ratio of the tensile modulus Y (GPa) to the apparent density D (g/cm ) of the composite film satisfies the relationship $3.0<Y/D<4.5$.

24. An electrical insulating composite film according to claim 16, wherein the dielectric constant is 2.4 to 3.0.

25. An insulating system in which an electrical insulating polyester film according to claims 1 is used for electrical insulation in an environment comprising a refrigerating medium of partially-hydrogenated halogenated carbon as a primary component and a polar oil.

26. An insulating system in which an electrical insulating polyester film according to claim 15 is used for electrical insulation in an environment comprising a refrigerating medium of partially-hydrogenated halogenated carbon as a primary component and a polar oil.

27. An insulating system in which an electrical insulating polyester film according to claim 16 is used for electrical insulation in an environment comprising a refrigerating medium of partially-hydrogenated halogenated carbon as a primary component and a polar oil.

28. An insulating system in which an electrical insulating polyester film according to any one of claims 17 to 24 is used for electrical insulation in an environment comprising a refrigerating medium of partially-hydrogenated halogenated carbon as a primary component and a polar oil.

29. An hermetic-type compressor comprising a motor in which an insulating system according to claim 25 is used for insulating an exciting coil.

30. An hermetic-type compressor comprising a motor in which an insulating system according to claim 26 is used for insulating an exciting coil.

31. An hermetic-type compressor comprising a motor in which an insulating system according to claim 27 is used for insulating an exciting coil.

32. An hermetic-type compressor comprising a motor in which an insulating system according to claim 28 is used for insulating an exciting coil.

* * * * *

UNITED STATES PATENT AND TRADEMARK OFFICE

CERTIFICATE OF CORRECTION

PATENT NO.: 6,054,224
DATED: April 25, 2000
INVENTOR(S): Itsuo Nagai, Seizo Aoki and Yukichi Deguchi It is certified that error appears in the above-identified patent and that said Letters Patent is hereby corrected as shown below:

In Column 9, in Table 3, Column 5, Row 17 (Example 16), please insert --A--.

In Column 10, in Table 3, Column 5, Row 2 (Example 17), please insert --A--.

In Column 13, line 21, please change "claims" to --claim--.

Signed and Sealed this

Tenth Day of April, 2001

Attest:

Nicholas P. Godici

NICHOLAS P. GODICI

*Attesting Officer*

*Acting Director of the United States Patent and Trademark Office*